(12) United States Patent
Choudhary et al.

(10) Patent No.: US 6,775,424 B2
(45) Date of Patent: Aug. 10, 2004

(54) MODULATION AND FILTRATION OF OPTICAL SIGNALS

(75) Inventors: Seemant Choudhary, Dallas, TX (US); Takeshi Hoshida, Richardson, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 337 days.

(21) Appl. No.: 10/007,987

(22) Filed: Nov. 12, 2001

(65) Prior Publication Data

US 2003/0090766 A1 May 15, 2003

(51) Int. Cl.[7] .............................. G02F 1/01; H04J 14/02
(52) U.S. Cl. ................................ 385/1; 385/2; 385/14; 385/37; 398/81
(58) Field of Search ............................. 385/14, 1, 2, 3, 385/37, 40, 88, 92; 398/81, 82, 85, 87

(56) References Cited

U.S. PATENT DOCUMENTS

| | | | |
|---|---|---|---|
| 3,835,386 A | 9/1974 | Court | 325/50 |
| 5,142,408 A | 8/1992 | Marshall et al. | 359/344 |
| 5,444,561 A | 8/1995 | Kaminishi | 359/158 |
| 5,448,390 A | 9/1995 | Tsuchiya et al. | 359/132 |
| 5,508,845 A | 4/1996 | Frisken | 359/161 |
| 5,625,479 A | 4/1997 | Suzuki et al. | 359/135 |
| 5,721,796 A * | 2/1998 | de Barros et al. | 385/37 |
| 5,745,613 A | 4/1998 | Fukuchi et al. | 385/24 |
| 5,828,478 A | 10/1998 | Thomine et al. | 359/181 |
| 5,926,297 A | 7/1999 | Ishikawa et al. | 359/115 |
| 6,005,702 A | 12/1999 | Suzuki et al. | 359/183 |
| 6,014,237 A | 1/2000 | Abeles et al. | 359/124 |
| 6,097,529 A | 8/2000 | Lee et al. | 359/279 |
| 6,141,129 A | 10/2000 | Mamyshev | 359/176 |
| 6,222,861 B1 | 4/2001 | Kuo et al. | 372/20 |
| 6,259,555 B1 | 7/2001 | Meli et al. | 359/337 |
| 6,266,171 B1 | 7/2001 | Gehlot | 359/181 |
| 6,384,954 B1 * | 5/2002 | Webb | 359/245 |
| 6,538,788 B2 * | 3/2003 | Franco et al. | 398/158 |
| 6,643,046 B2 * | 11/2003 | Ibe et al. | 359/238 |
| 2001/0024307 A1 * | 9/2001 | Franco et al. | 359/161 |
| 2002/0030877 A1 * | 3/2002 | Way et al. | 359/183 |

FOREIGN PATENT DOCUMENTS

| | | | | |
|---|---|---|---|---|
| EP | 0 977 382 A2 | 2/2000 | | H04B/10/155 |
| EP | 1 128 580 A2 | 8/2001 | | H04B/10/155 |

OTHER PUBLICATIONS

A. Hirano, Y. Miyamoto, K. Yonenaga, A. Sano and H. Toba, "40 Gbit/s L–band transmission experiment using SPM–tolerant carrier–suppressed RZ format," *Electronics Letters*, vol. 35, No. 25, Dec. 9, 1999, 2 pages.
PCT International Search Report in International Application No. PCT/IB 02/04728, dated Apr. 17, 2003, 7 pages.

* cited by examiner

*Primary Examiner*—Brian M. Healy
(74) *Attorney, Agent, or Firm*—Baker Botts L.L.P.

(57) ABSTRACT

An optical modulator for generating an optical information signal includes a first modulator that modulates an optical carrier with a clock signal. The optical modulator further includes a filter that suppresses a residual carrier component of modulated optical signals. In addition, the optical modulator includes a second modulator for modulating an optical signal with a non-return to zero data signal. When combined, the first and second modulator and the filter operate to transform an optical carrier signal into an optical information signal that is highly tolerant to dispersion and non-linear effects in optical fibers.

21 Claims, 2 Drawing Sheets

MODULATION AND FILTRATION OF OPTICAL SIGNALS

TECHNICAL FIELD OF THE INVENTION

This invention relates generally to optical communication systems and, more particularly, to modulation and filtering of optical signals.

BACKGROUND OF THE INVENTION

In optical communication systems, optical signals transport information along optical fibers. Transmitters generate these optical signals by modulating optical carriers using various techniques. In some systems, transmitters use non-return to zero (NRZ) modulation for transmissions. However, at higher bit rates appropriate for long-haul transmissions, NRZ modulated transmissions are highly susceptible to degradations caused by non-linear effects. Thus, for high-bit rate transmissions, systems may use carrier-suppressed, return to zero (CS-RZ) modulation, which has a high tolerance to non-linear effects in optical fibers. However, while CS-RZ modulation achieves a higher tolerance to non-linear effects than NRZ modulation, CS-RZ modulated transmissions suffer from a reduced dispersion tolerance compared to NRZ modulated transmissions.

SUMMARY OF THE INVENTION

In accordance with the present invention, techniques for modulation and filtering of optical signals are provided that substantially eliminate or reduce disadvantages or problems associated with previous techniques.

In accordance with one embodiment of the present invention, an optical modulator includes a first modulator that receives an optical carrier signal and modulates the optical carrier signal with a clock signal to generate a clock-modulated optical signal. The optical modulator also includes an optical filter attached to the first modulator. The optical filter suppresses a residual carrier component of the clock-modulated optical signal received from the first modulator. The optical modulator further includes a second modulator attached to the carrier suppression filter. The second modulator modulates the filtered optical signal with a non-return to zero data signal.

Embodiments of the present invention provide various technical advantages. These techniques permit an optical modulator to increase dispersion tolerance of transmitted signals while maintaining a high tolerance to non-linear effects in optical fibers. Thus, the optical modulator is well suited for use in long-haul transmissions of high data rate signals. Moreover, these modulation and filtering techniques permit the use of relatively poor quality components. Therefore, as opposed to previous optical modulators, a modulator according to the present invention may use less expensive components while achieving greater dispersion tolerance. Therefore, these modulators may achieve both increased performance and reduced costs.

Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
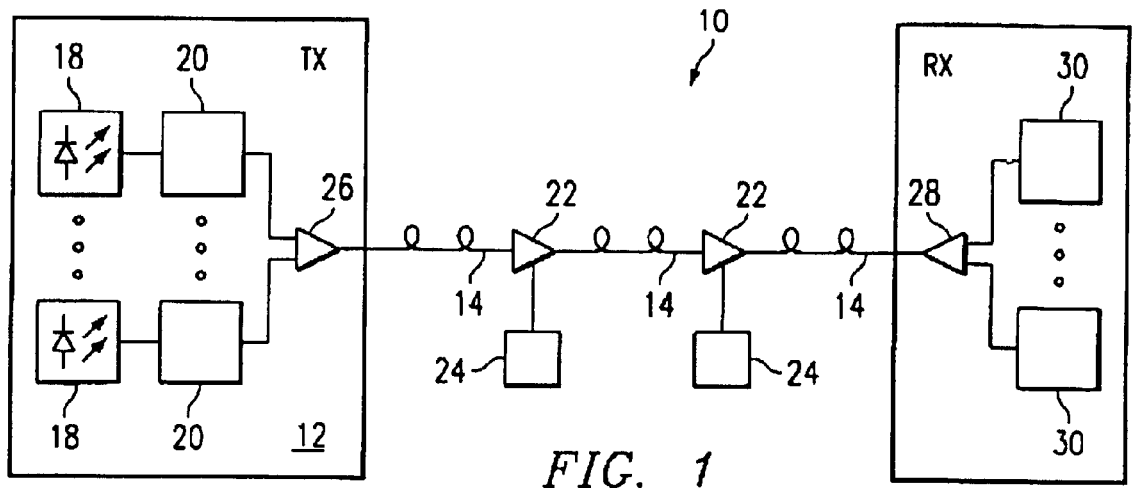
FIG. 1 is a block diagram illustrating an optical communication system having a transmission module with an optical modulator in accordance with an embodiment of the present invention.

FIG. 1 illustrates an optical communication system, indicated generally at 10, that includes a transmission module 12 coupled across multiple spans of optical fibers 14 to a receiver 16. Transmission module 12 includes light sources 18 for generating optical carrier signals and optical modulators 20 for modulating the signals for transmission on optical fiber 14. In general, transmission module 12 generates optical signals for communicating information on optical fiber 14 by passing optical carriers generated by light sources 18 through optical modulators 20, with each optical modulator 20 modulating a received optical carrier with a clock signal, filtering the clock-modulated optical signal to suppress residual carrier components, and modulating the filtered optical signal with a non-return to zero data signal.

Transmission module 12 represents any suitable collection and arrangement of hardware, including any appropriate logic, for generating and transmitting optical signals on optical fiber 14. While illustrated in a relatively simple embodiment, system 10 contemplates transmission module 12 having any appropriate elements for communicating information on optical fiber 14. For example, as shown in this illustration, transmission module 12 may include multiple light sources 18 and optical modulators 20, with signals from these elements multiplexed together by a multiplexer 26 for transmission of multiple optical signals across optical fiber 14 at various wavelengths. Therefore, transmission module 12 uses any suitable techniques for generating optical information signals and transmitting these signals on optical fibers 14 for receipt by receiver 16.

Receiver 16 represents any suitable combination and arrangement of hardware, including any appropriate logic, for receiving, separating, and decoding optical signals received on optical fiber 14. In the embodiment illustrated, receiver 16 includes a de-multiplexer 28 that separates the various the received optical signals according to wavelengths and then distributes the separated signals to decoders 30. However, as with the illustration of transmission module 12, system 10 contemplates receiver 16 including any appropriate combination and arrangement of hardware and associated logic for receiving and processing optical signals. In the embodiment illustrated, receiver 16 links to transmission module 12 using multiple spans of optical fiber 14. To facilitate the long-haul transmission of optical signals, optical amplifiers 22 are interposed between spans of optical fiber 14. Amplifiers 22 may by discrete and/or in-line amplifiers, such as Ramen amplifiers. Regardless, these optical amplifiers 22 increase the strength, or boost, one or more optical signals propagating along optical fibers 14.

According to particular embodiments, transmission module 12 transmits information along optical fibers 14 at relatively high data rates that can negatively impact the quality of communications. In these high data rate systems, transmission module 12 may transmit information at data rates at or exceeding 10 gigabits per second per channel, with some applications rapidly approaching or exceeding 40 gigabits per second per channel. Frequencies of these communications may commonly range from approximately 1570 nm to 1610 nm or from approximately 1530 nm to 1560 nm. However, while the disclosed modulation techniques can prove especially advantageous in high data rate applications, these techniques may provide advantages in virtually any optical communication system.

As optical signals propagate along optical fibers 14, they may suffer from dispersion, which typically increases as the length of optical fiber 14 increases. Dispersion is caused by the different velocities of different frequencies of light propagating along optical fiber 14. Since pulses of information typically are represented by energy at multiple frequencies, a pulse of information will spread out as it propagates along optical fiber 14, thus degrading the signal received by receiver 16. To minimize the effects of dispersion on optical signals, the optical link between transmission module 12 and receiver 16 includes multiple dispersion compensators 24. Compensators 24 attempt to minimize the degradation of signals by realigning the various frequencies of light in propagating optical signals. However, compensators 24 are limited in the amount of dispersion that may be accommodated. Moreover, as signals propagate along fibers 14, dispersion accumulates. Thus slight errors or dispersion "missed" by each compensator 24 accumulates, resulting in potentially significant degradations to transmissions.

Thus, the characteristics of the optical link between transmission module 12 and receiver 16 impact the quality of signals from transmission module 12 appropriate for delivering sufficient information for decoding by receiver 16. In general, a higher "quality" optical signal generated by transmission module 12 can tolerate longer lengths of optical fibers 14 and more amplifiers 22. However, regardless of whether the link between transmission module 12 and receiver 16 includes any interposing elements, an optical signal tolerant to non-linear effects and dispersion is desirable. Using optical modulator 20, transmission module 12 generates an optical signal that is tolerant to both non-linear effects in optical fibers 14 and to dispersion.

Figure 2:
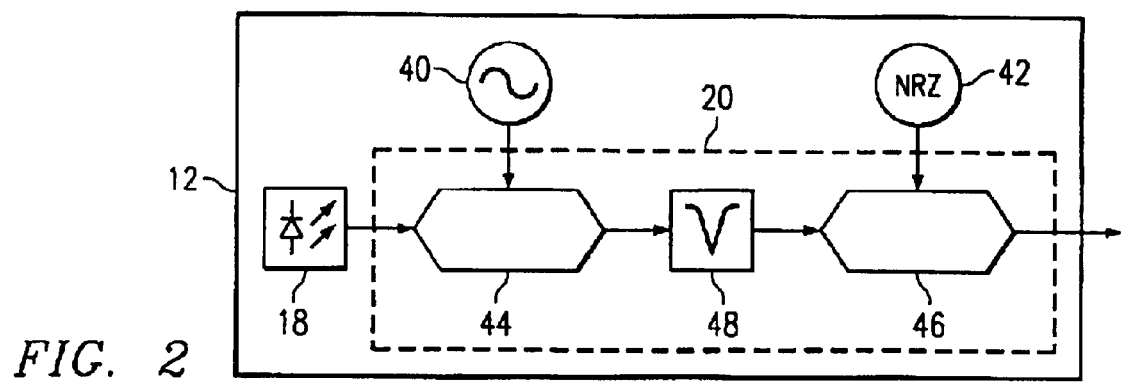
FIG. 2 is a block diagram illustrating exemplary functional components of the transmission module of FIG. 1 in accordance with one embodiment of the present invention.

FIG. 2 is a block diagram illustrating exemplary components of transmission module 12. In the embodiment illustrated, transmission module 12 includes light source 18, a clock signal generator 40, a non-return to zero (NRZ) data signal generator 42, and optical modulator 20, which includes modulators 44 and 46 and a filter 48. In general, transmission module 12 communicates information in optical signals, using optical modulator 20 to generate optical signals tolerant to nonlinear effects and dispersion in optical fibers 14. More specifically, optical modulator 20 provides multi-stage processing of an optical carrier to provide a dispersion tolerant output.

Light source 18 represents equipment, such as a laser, that can generate an optical carrier at a prescribed frequency. Light source 18 then couples a generated optical carrier signal into optical modulator 20. Optical modulator 20 modulates the optical carrier with one or more signals, including a data signal, to generate an optical information signal. Transmission module 12 may then communicate the optical information signal on optical fiber 14 to transmit information to receiver 16. However, before transmission of the optical information signal on optical fiber 14, transmission module 12 may further filter, multiplex, or otherwise modify the optical information signal from optical modulator 20.

Clock signal generator 40 generates a sinusoidal clock signal for modulation with an optical carrier by optical modulator 20. In the embodiment illustrated, the clock signal generated by generator 40 is a substantially sinusoidal electrical signal at a specified frequency. The frequency of the clock signal may relate to characteristics of other components and/or signals within system 10. For example, the frequency for the clock signal may depend upon the frequency of the optical carrier generated by light source 18, a frequency of signals generated by NRZ generator 42, and/or characteristics of various components and transmission paths within system 10. According to the embodiment illustrates, clock signal generator 40 generates a sinusoidal clock signal at a frequency one half the frequency of the data rate of communications. NRZ generator 42 generates a non-return to zero data signal for use by optical modulator 20 in producing an optical information signal. NRZ generator 42 generates this signal at a specified frequency. Characteristics of the data signal generated by NRZ generator 42 may be suitably varied.

In the embodiment illustrated, optical modulator 20 includes modulators 44 and 46 and filter 48. Modulators 44 and 46 each represent appropriate elements for modulating received optical signals with electrical signals and/or other optical signals. According to particular embodiments, modulators 44 and 46 are implemented using interferometers, such as Mach-Zehnder interferometers. Filter 48 represents any suitable element or elements for suppressing various components of optical signals. In the embodiment illustrated, filter 48 suppresses energy on the carrier frequency of received optical signals. Thus, filter 48 is tuned to reject energy at the carrier frequency of the optical carrier signal generated by light source 18. According to particular embodiments, filter 48 may be implemented using a fiber Bragg grating or with a Mach-Zehnder interferometer having arm-lengths suitably configured to suppress the carrier frequency.

In operation, optical modulator 20 receives an optical carrier signal from light source 18 and processes this carrier signal to generate an optical information signal. More specifically, optical modulator 20 receives the optical carrier signal, a clock signal from generator 40, and a data signal from NRZ generator 42 and generates an optical information signal for communicating information from transmission module 12 on optical fiber 14. Within optical modulator 20, modulator 44 receives an optical carrier signal generated by light source 18 and modulates the optical carrier signal with the clock signal from generator 40. This generates a clock-modulated optical signal. The operation of modulator 44 may be characterized by a number of various parameters, including extinction ratio. The extinction ratio of an element, measured in decibels, describes optimal biasing conditions and how efficiently available laser transmitter power is converted to modulation power. According to the embodiment illustrated, the extinction ratio provides a measurement of the ratio of the output power in an on-state of modulation to the output power in an off-state. Precisely measuring extinction ratios accurately and repeatably may prove difficult. However, it is generally understood that higher extinction ratios may be achieved by using higher cost, higher precision elements. According to particular embodiments, optical modulator 20 provides dispersion tolerant signals, even given a relatively low extinction ratio of modulator 44, such as an extinction ratio lower than 15 dB.

Filter 48 receives the clock-modulated signal from modulator 44 and suppresses residual carrier components of the clock-modulated optical signal to generate a filtered optical signal. For example, filter 48 may have a stop band bandwidth centered on or near the carrier frequency of signals generated by light source 18. To operate effectively, the width of the stop band of filter 48 should be tailored to suppress residual carrier components at the carrier frequency without negatively impacting the frequency pulses in the clock-modulated optical signal. According to particular embodiments, a stop band bandwidth of less than 40 Ghz may be effective in suppressing energy on the carrier frequency of the optical signal received by filter 48. In addition to tailoring the stop band bandwidth of filter 48, the elements selected for use as filter 48 should be tailored to provide a sufficient rejection ratio. The rejection ratio, measured in decibels, indicates a ratio of energy permitted to flow through filter 48 to the energy suppressed within the stop band of filter 48. Typically, filters with higher rejection ratios require more expensive, precision elements than optical filters with lower rejection ratios. According to particular embodiments, filter 48 provides a rejection ratio of at least 10 decibels. However, benefits may be realized by using a filter having a rejection ratio greater than zero dB, with the greatest benefits realized using filters having rejection ratios of approximately 30 dB or more.

Modulator 46 receives the filtered optical signal from filter 48 and modulates this signal with a data signal received from NRZ generator 42. This results in an optical information signal for transmission along optical fiber 14 to receiver 16. Because of the modulation and filtering performed by transmission module 12, this optical information signal may have a high tolerance against dispersion and non-linear effects in optical fibers 14 in comparison to optical signals generated by conventional modulators. In addition, the filtering performed by optical modulator 20 increases the acceptable range of performance for various components. Thus, system 10 may implement optical modulator 20 using lower cost components than conventional modulators while maintaining increased performance.

While the embodiment illustrated and the preceding description focus on a particular embodiment for transmission module 12 that includes specific elements, system 10 contemplates transmission module 12 having any suitable combination and arrangement of elements for modulating an optical carrier with a clock signal and a data signal and filtering the optical signal to suppress a residual carrier component. Thus, for example, while optical modulator 20 is illustrated with elements coupled in a particular arrangement, additional and/or different elements may be used and these elements may be arranged appropriately, so long as filtration of optical signals occurs after modulation of the optical carrier with a clock signal.

Figure 3A:
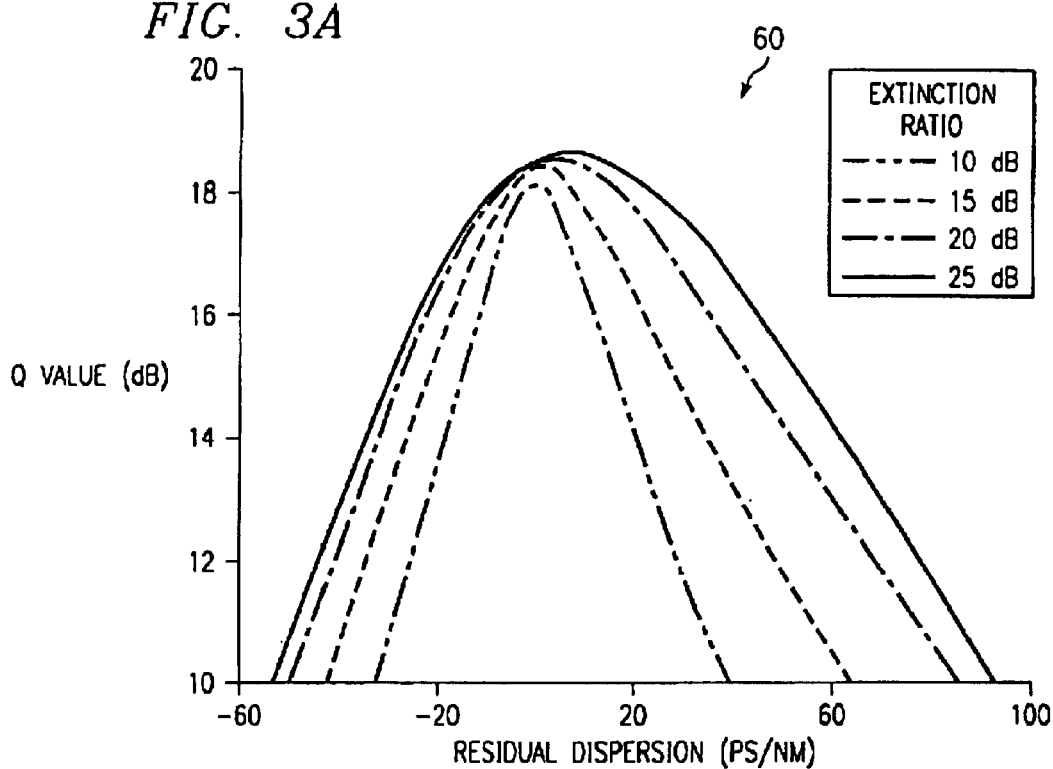
FIGS. 3A and 3B are graphs illustrating increases in dispersion tolerance resulting from use of the optical modulator in comparison to previous techniques.
Figure 3B:
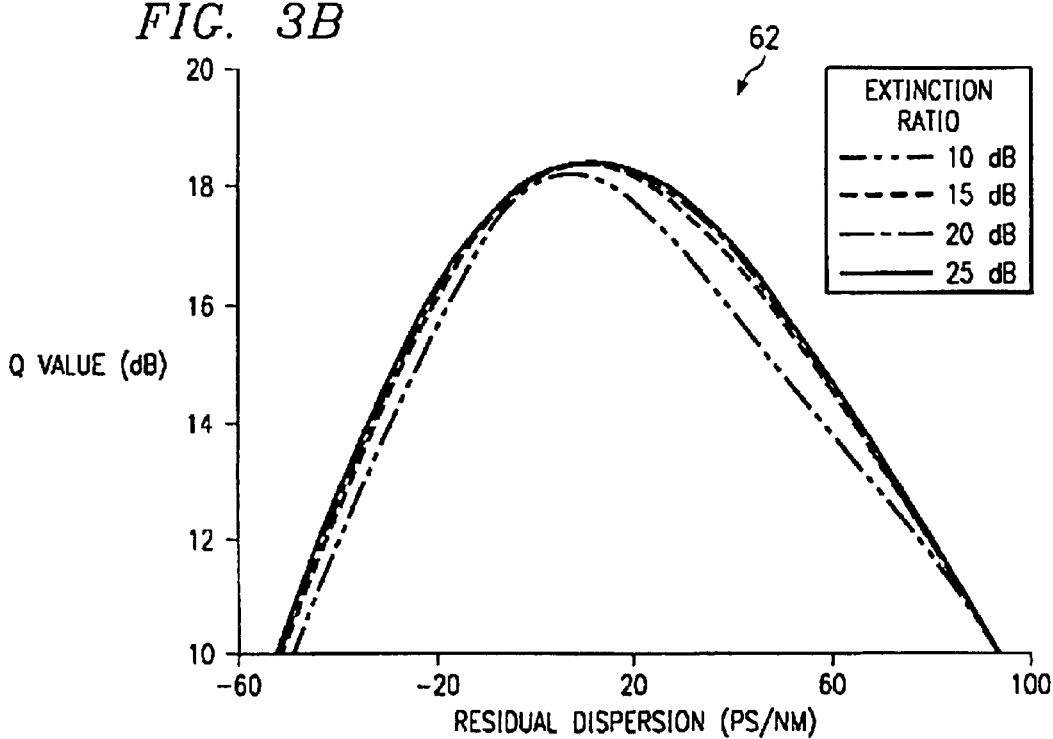

FIGS. 3A and 3B are graphs illustrating the increased dispersion tolerance of optical information signals generated using optical modulator 20 when compared with conventional carrier-suppressed, return-to-zero (CS-RZ) optical modulators. FIG. 3A charts the Q value versus residual dispersion for an optical signal modulated using a conventional configuration of optical modulators. More specifically, graph 60 plots the Q factors of 43 gigabits-per-second CS-RZ signals as a function of dispersion by adding a variable amount of chromatic dispersion at a fixed optical signal-to-noise ratio of 25 decibels. The dispersion varies by modifying the length of fiber having a dispersion coefficient of plus or minus 16 ps/nm/km. For graph 60, the conventional optical modulator is modeled with inputs of a 43 gigabitsper-second NRZ data signal and a 21.5 Ghz sinusoidal clock signal. The extinction ratio of an NRZ modulator within the conventional optical modulator is fixed at 12 decibels, and the extinction ratio of a clock modulator within the conventional optical modulator is varied at values of 10, 15, 20, and 25 decibels. Graph 60 illustrates the rapid decrease in dispersion tolerance as the extinction ratio becomes lower. According to particular embodiments, systems are designed to a particular dispersion tolerance, such as a range of residual dispersion values corresponding to a Q value of greater than 16 decibels. For such a system, the dispersion tolerance of signals transmitted using a clock module with a 10 decibel extinction ratio would be approximately one-third the dispersion tolerance given a clock modulator with a 25 decibel extinction ratio. Thus, dispersion tolerance of conventional optical modulators is highly dependent upon the quality of elements within the modulator, thus potentially driving up the cost of providing conforming equipment.

FIG. 3B models, using graph 62, the dispersion tolerance of optical information signals generated by optical modulator 20. For graph 62, similar signal inputs are used to model the dispersion tolerance as were used for graph 60 of a conventional optical modulator. That is, the dispersion tolerance of signals generated by optical modulator 20 is modeled with inputs of a 43 gigabits-per-second NRZ data signal and a 21.5 gigahertz sinusoidal clock signal. In addition, as with the modeling of the conventional modulator, graph 62 displays the dispersion tolerance of optical signals given the performance of modulator 44 at various extinction ratios. For graph 62, a fiber Bragg grating (FBG) with a 25 Ghz stop band and a rejection ratio of 20 decibels is modeled. This affords greater flexibility in selecting components for implementing modulators 44 and 46, since the optical information signal generated by optical modulator 20 is less dependent upon extinction ratios than conventional systems. Graph 52 illustrates that a dispersion tolerance of optical information signals generated by optical modulator 20 is virtually independent of the extinction ratio. Therefore, optical modulator 20 may potentially include lower quality, lower cost components than conventional optical modulators yet maintain equal or greater performance characteristics. However, while the preceding graphs demonstrate the performance of optical modulator 20 based upon specific inputs and specific values, system 10 contemplates optical modulator 20 handling any appropriate signals and providing suitable extinction ratios, rejection ratios, and other configurations to increase dispersion tolerance of optical information signals. Thus, the preceding graphs are presented only as examples of the operation of particular embodiments of optical modulator 20.

Figure 4:
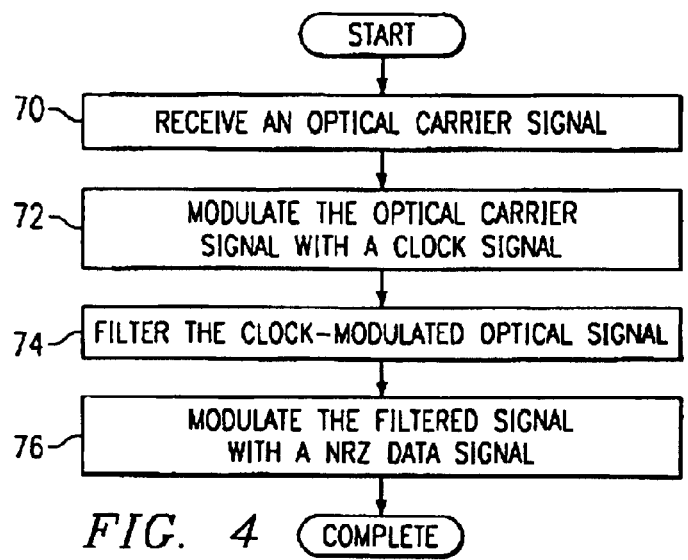
FIG. 4 is a flowchart illustrating a method for modulating and filtering an optical signal using the optical modulator in accordance with one embodiment of the present invention.

FIG. 4 is a flowchart illustrating a method for modulating and filtering an optical carrier to generate an optical information signal that, according to particular embodiments, is tolerant to dispersion and non-linear effects in optical fibers 14. Optical modulator 20 receives an optical carrier signal from light source 18 at step 70. Optical modulator 20 modulates the received optical carrier signal with a clock signal at step 72. For example, using modulator 44, optical modulator 20 may modulate the received optical carrier signal with a clock signal generated by clock signal generator 40. This generates a clock-modulated optical signal that, in many instances, may contain residual components at the carrier frequency of the received carrier signal. Thus, optical modulator filters the clock-modulated optical signal to remove residual carrier components at step 74. For example, using filter 48, optical modulator 20 may suppress energy around a frequency of the optical carrier signal. Optical modulator 20 modulates the filtered signal with a NRZ data signal at step 76. For example, using modulator 46, optical modulator 20 may modulate the filtered signal generated by filter 48 with a NRZ data signal generated by NRZ generator 42. This generates an optical information signal that is tolerant to dispersion and non-linear effects in optical fibers 14.

The preceding flowchart illustrates only an exemplary method of operation, and system 10 contemplates optical modulator 20 using any suitable techniques and elements for modulating an optical carrier with a clock signal and a NRZ data signal and filtering the modulated signal to remove residual carrier components. Thus, many of the steps in this flowchart may take place simultaneously and/or in different orders than as shown. In addition, optical modulator 20 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. An optical modulator comprising:
    a first modulator operable to receive an optical carrier signal and to modulate the optical carrier signal with a clock signal to generate a clock-modulated optical signal;
    an optical filter coupled to the first modulator, the optical filter operable to suppress a residual carrier component of the clock-modulated optical signal to generate a filtered optical signal, where the suppression of the residual carrier component provides dispersion tolerance of an output of the optical modulator; and
    a second modulator coupled to the optical filter, the second modulator operable to modulate the filtered optical signal with a non-return to zero data signal.

2. The optical modulator of claim 1, wherein the first modulator and the second modulator each comprise a Mach-Zehnder interferometer.

3. The optical modulator of claim 1, wherein optical filter comprises a fiber Bragg grating.

4. The optical modulator of claim 1, wherein the optical filter comprises a Mach-Zehnder interferometer.

5. The optical modulator of claim 1, wherein optical filter has a rejection ratio of greater than 10 dB.

6. The optical modulator of claim 1, wherein the optical filter has a stop-band bandwidth of less than 50 Ghz.

7. The optical modulator of claim 1, wherein the residual carrier component comprises energy on a carrier frequency of the optical signal.

8. The optical modulator of claim 1, wherein the suppression of the residual carrier component provides dispersion tolerance of an output of the optical modulator when an extinction ratio of the first modulator is less than 25 dB.

9. A multi-stage optical modulation method, the method comprising the steps of:
    receiving an optical carrier signal
    modulating the optical carrier signal with a clock signal to generate a clock- modulated optical signal;
    suppressing a residual carrier component of the clock-modulated optical signal to generate a filtered optical signal, where the suppression of the residual carrier component provides dispersion tolerance of the filtered optical simial; and
    modulating the filtered optical signal with a non-return to zero data signal.

10. The method of claim 9, wherein modulating the optical carrier signal with a clock signal comprises modulating the optical carrier signal using a Mach-Zehnder interferometer.

11. The method of claim 9, wherein suppressing the residual carrier component comprises filtering the clock-modulated optical signal using a fiber Bragg grating.

12. The method of claim 11, wherein the fiber Bragg grating has a rejection ratio of greater than 10 dB.

13. (OrIginal) The method of claim 11, wherein the fiber Bragg grating has a stop-band bandwidth of less than 50 Ghz.

14. The method of claim 9, wherein the residual carrier component comprises energy on a carrier frequency of the optical signal.

15. An optical modulator comprising:
    means for receiving an optical carrier signal means for modulating the optical carrier signal with a clock signal to generate a clock-modulated optical signal;
    means for suppressing a residual carrier component of the clock-modulated optical signal to generate a filtered optical signal, where the suppression of the residual carrier component provides dispersion tolerance of an output of the optical modulator; and
    means for modulating the filtered optical signal with a non-return to zero data signal.

16. The optical modulator of claim 15, wherein the means for suppressing a residual carrier component has a rejection ratio of greater than 10 dB.

17. The optical modulator of claim 15, wherein the means for suppressing a residual carrier component has a stop-band bandwidth of less than 50 Ghz.

18. The optical modulator of claim 15, wherein the residual carrier component comprises energy on a carrier frequency of the optical signal.

19. The optical modulator of claim 15, wherein the suppression of the residual carrier component provides dispersion tolerance of an output of the optical modulator when an extinction ratio of the means for modulating the optical carrier signal with a clock signal is less than 25 dB.

20. A multi-stage optical modulator comprising:
    a first stage clock modulator;
    a second stage non-return to zero modulator; and
    an optical filter disposed between the first stage clock modulator and the second stage non-return to zero modulator, the optical filter onerable to suppress a residual carrier comPonent of a modulated optical signal received from the first staae clock modulator, where the suppression of the residual carrier component provides dispersion tolerance of an output of the ontical modulator.

21. The method of claim 9, wherein modulating the optical carrier signal comprises modulating the optical carrier signal using an optical modulator having an extinction ratio of less than 25 dB.

* * * * *

UNITED STATES PATENT AND TRADEMARK OFFICE
CERTIFICATE OF CORRECTION

PATENT NO. : 6,775,424 B2
DATED : August 10, 2004
INVENTOR(S) : Choudhary et al.

It is certified that error appears in the above-identified patent and that said Letters Patent is hereby corrected as shown below:

Column 2,
Line 54, after "various", delete "the".

Column 4,
Line 17, delete "illustrates", and insert -- illustrated --.

Column 6,
Line 1, delete "gigabitsper-second", and insert -- gigabits-per-second --.

Column 8,
Line 3, after "optical", delete "simial" and insert -- signal --;
Line 16, after "13.", delete "(OrIginal)";
Line 23, after "signal", insert -- ; --, and start "means" on next line;
Line 54, after "filter", delete "onerable", and insert -- operable --;
Line 55, after "carrier", delete "ComPonent", and insert -- component --;
Line 56, after "first", delete "staae" and insert -- stage --;
Line 59, after "ontical", and insert -- optical --.

Signed and Sealed this

Fifteenth Day of March, 2005

JON W. DUDAS
*Director of the United States Patent and Trademark Office*